United States Patent
Murray et al.

(10) Patent No.: US 8,951,105 B2
(45) Date of Patent: Feb. 10, 2015

(54) COMBINE SIDE-SHAKE CONTROL SYSTEM SLIDER JOINT

(71) Applicant: CNH America LLC, New Holland, PA (US)

(72) Inventors: Craig E. Murray, Davenport, IA (US); Tyler L. Nelson, Rochester, MN (US); Venugopal Chiratanagandla, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 91 days.

(21) Appl. No.: 13/724,345

(22) Filed: Dec. 21, 2012

(65) Prior Publication Data

US 2014/0179381 A1 Jun. 26, 2014

(51) Int. Cl.
*A01F 12/32* (2006.01)
*B07B 1/00* (2006.01)
*A01F 12/44* (2006.01)
*A01D 75/28* (2006.01)

(52) U.S. Cl.
CPC ............ *A01F 12/448* (2013.01); *A01D 75/282* (2013.01)
USPC ....................................................... 460/101

(58) Field of Classification Search
CPC ..... A01D 75/282; A01F 12/448; A01F 12/32; A01F 12/44
USPC ........ 56/14.6; 209/416; 460/101, 114, 90, 21, 460/92, 9
See application file for complete search history.

(56) References Cited

U.S. PATENT DOCUMENTS

| 86,942 | A | | 2/1869 | Robinson |
|---|---|---|---|---|
| 853,061 | A | | 5/1907 | Case |
| 2,123,876 | A | | 7/1938 | Berry et al. |
| 2,189,706 | A | | 2/1940 | Clipston |
| 2,500,448 | A | * | 3/1950 | Bozarth ........................ 209/416 |
| 2,893,558 | A | * | 7/1959 | Zollinger ...................... 209/254 |
| 4,259,829 | A | | 4/1981 | Strubbe |
| 4,332,127 | A | | 6/1982 | Staiert et al. |
| 4,355,647 | A | | 10/1982 | Heidjann et al. |
| 4,535,788 | A | * | 8/1985 | Rowland-Hill et al. .......... 460/9 |
| 4,598,718 | A | * | 7/1986 | Glaubitz et al. .................. 460/9 |
| 4,736,753 | A | | 4/1988 | Glaubitz et al. |
| 4,897,071 | A | * | 1/1990 | Desnijder et al. ............... 460/10 |
| 5,205,786 | A | * | 4/1993 | Murphy ........................... 460/9 |
| 6,117,006 | A | | 9/2000 | Hofer |
| 6,579,172 | B2 | * | 6/2003 | Lauer ............................ 460/101 |
| 7,322,882 | B2 | | 1/2008 | Duquesne et al. |
| 7,927,199 | B2 | | 4/2011 | Adamson et al. |

(Continued)

*Primary Examiner* — Árpád Fábián-Kovács
(74) *Attorney, Agent, or Firm* — Patrick M. Sheldrake; Seyed V. Sharifi T.

(57) ABSTRACT

A combine side-shaking control system that includes a sieve for separating crop material from other material, located in a plane having an X dimension and a Y dimension and configured to move in a fore-aft direction in the X dimension, in a side-to-side direction in the Y dimension and in an up-down direction in a Z dimension. The system also includes a side-shaking assembly configured to move the sieve in the side-to-side direction in the Y dimension. The fixed arm is attached to the sieve and configured to move with the sieve in (i) the fore-aft direction in the X dimension, (ii) the side-to-side direction in the Y dimension and (iii) the up-down direction in the Z dimension. The side-shaking coupling portion comprises a moving portion configured to move in a diagonal direction having a fore-aft component in the X dimension and an up-down component in the Z dimension.

17 Claims, 8 Drawing Sheets

(56) References Cited

U.S. PATENT DOCUMENTS

| | | | |
|---|---|---|---|
| 8,608,234 B2* | 12/2013 | Haeusler et al. | 296/190.07 |
| 8,622,792 B1* | 1/2014 | Murray | 460/101 |
| 2005/0282601 A1* | 12/2005 | Duquesne et al. | 460/101 |
| 2006/0229119 A1 | 10/2006 | Wamhof et al. | |
| 2006/0249219 A1* | 11/2006 | Vanderjeugt et al. | 139/87 |
| 2010/0016044 A1* | 1/2010 | Adamson et al. | 460/101 |
| 2013/0109450 A1* | 5/2013 | Puvak et al. | 460/101 |

\* cited by examiner

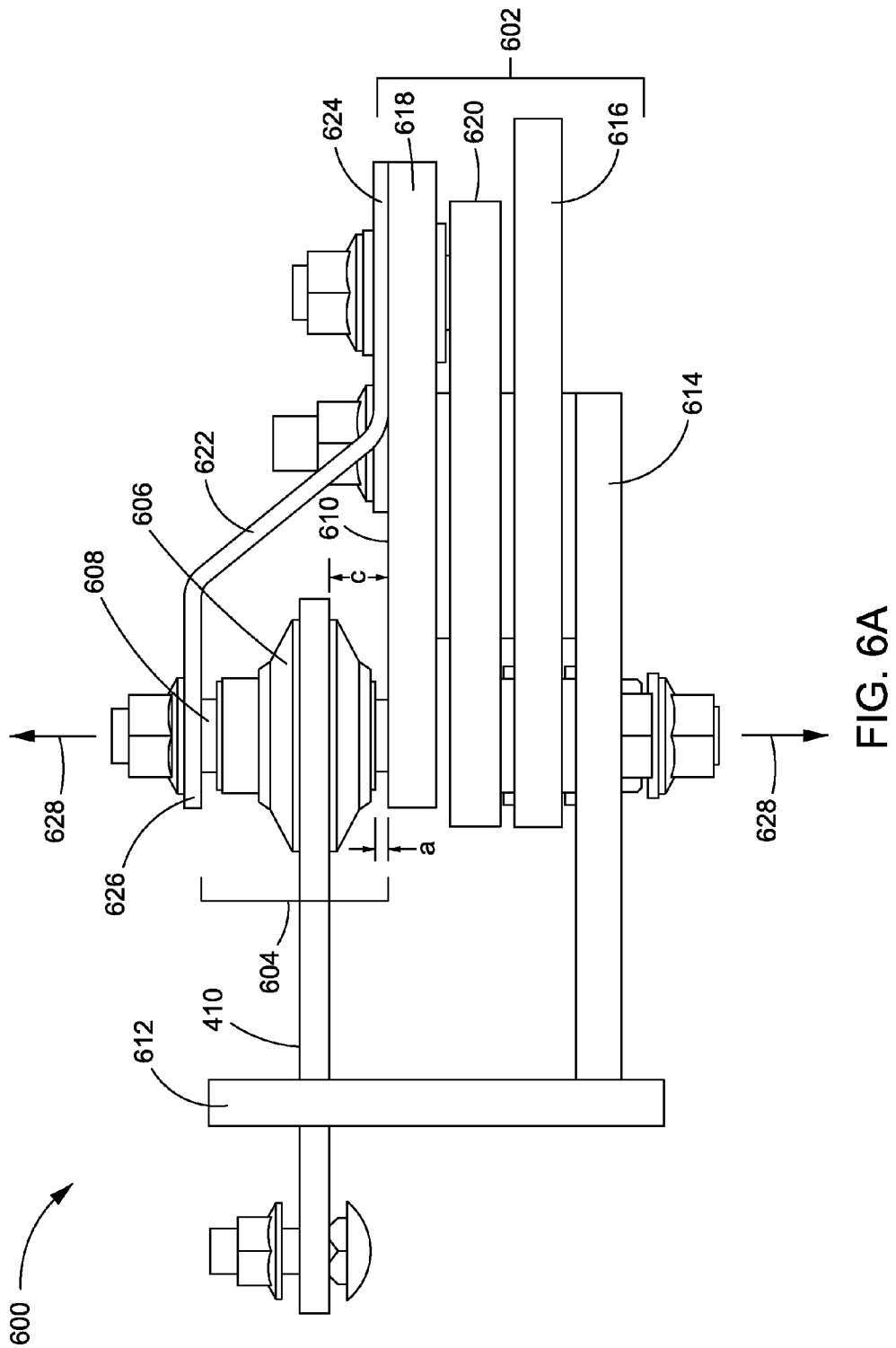

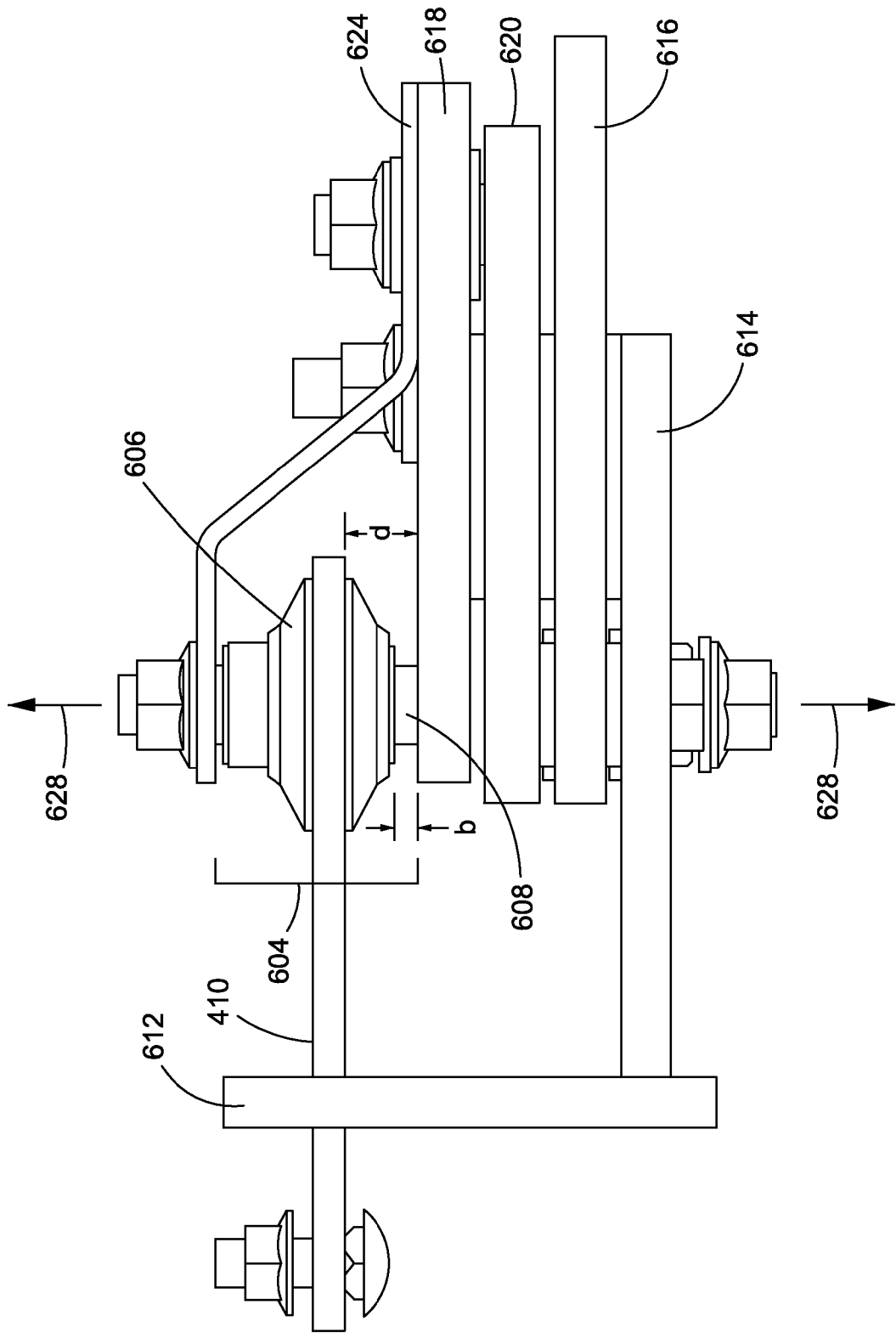

COMBINE SIDE-SHAKE CONTROL SYSTEM SLIDER JOINT

TECHNOLOGY FIELD

The present invention relates generally to a control system for a side-shake cleaning mechanism for use with a harvester, such as a combine harvester, and more particularly to methods and systems to control the movement of a side-shake cleaning mechanism in a combine harvester.

BACKGROUND

A combine harvester is a machine that is used to harvest grain crops. The objective is to complete several processes, which traditionally were distinct, in one pass of the machine over a particular part of the field. Among the crops that may be harvested with a combine are wheat, oats, rye, barley, corn, soybeans, flax or linseed, and others. The waste (e.g., straw) discharged on the field includes the remaining dried stems and leaves of the crop which may be, for example, chopped and spread on the field as residue or baled for feed and bedding for livestock.

A combine harvester cuts crop using a wide cutting header. The cut crop may be picked up and fed into the threshing and separating mechanism of the combine, typically consisting of a rotating threshing rotor or cylinder to which grooved steel bars commonly referred to as rasp bars or threshing elements may be bolted. These rasp bars thresh and aid in separating the grains from the chaff and straw through the action of the drum against the concaves, i.e., shaped "half drum," that may also be fitted with steel bars and a meshed grill, through which grain, chaff and smaller debris may fall, whereas the straw, being too big or long, is carried through to the outlet. The chaff, straw, and other undesired material are returned to the field via a spreader mechanism.

In an axial flow combine, this threshing and separating system serves a primary separation function. The harvested crop is threshed and separated as it is conveyed between a longitudinally arranged rotor and the inner surface of an associated chamber comprising threshing and separating concaves, and a rotor cage or cover. The cut crop material spirals and is conveyed along a helical path along the inner surface of the chamber until substantially only larger residue remains. When the residue reaches the end of the threshing drum, it is expelled out of the rear of the combine. Meanwhile, the grain, chaff, and other small debris fall through the concaves and grates onto a cleaning device or shoe. For ease of reference, this smaller particulate crop material that contains the grain and chaff is referred to as threshed crop. The grain still needs to be further separated from the chaff by way of a winnowing process.

Clean grain is separated out of the threshed crop by way of a flat oscillating cleaning system that can include a combination of oscillating screens (sieves), a fan which blows air through/above/beneath the sieves, and some mechanism which transports the material to be cleaned from beneath the threshing system to the sieves. Clean grain that is separated from residue via the sieves is typically transported to a grain tank in the combine for temporary storage. The grain tank is typically located atop the combine and loaded via a conveyer that carries clean grain collected in the cleaning system to the grain tank. The grain may then be unloaded through a conveying system to a support trailer or vehicle, allowing large quantities of grain to be unloaded in the field without needing to stop harvesting when the grain tank fills.

The cleaning system of a combine swings on arms which are coupled to the cleaning system at one end and coupled to the combine chassis at another end. Accordingly, as the cleaning system swings back and forth, the cleaning system moves in an arc having a fore/aft direction with some up-down direction. Presently, combines may be equipped with hillside compensation mechanisms (e.g., side-shaking mechanisms) for combine cleaning systems which provide compensation to the cleaning system when the combine experiences a change in inclination (i.e., harvesting on uneven terrain). On inclined ground, the side-shaking mechanisms introduce an additional side-to-side direction in the shake geometry of a sieve, causing material to resist its natural tendency to migrate to the lower side of the sieve and remain more evenly distributed across the width of the sieve.

These conventional side-shaking mechanisms are configured to move freely in the fore-aft direction and the side-to-side direction. Movement in the up-down, however, causes stress to side-shaking mechanisms, undesirably affecting the overall motion of the cleaning system. To compensate for some of the stress, some side-shaking mechanisms are configured to physically bend in the up-down direction or have elements, such as rubber bushings or ball joints, to allow some movement in the up-down direction. These conventional compensation approaches, however, make the cleaning system harder to move, causing the cleaning system motion to be less smooth and perform less efficiently. Further, stress is still present with the conventional compensation approaches, affecting the overall performance and operational life of the cleaning system. What is needed is an improved side-shaking assembly for a combine cleaning system.

SUMMARY

Embodiments of the present invention are directed to a combine side-shaking control system, that includes a sieve for separating crop material from other material, located in a plane having an X dimension and a Y dimension and configured to: (i) move within the plane in a fore-aft direction in the X dimension, (ii) move within the plane in a side-to-side direction in the Y dimension and (iii) move outside of the plane in an up-down direction in a Z dimension. The control system also includes a side-shaking assembly coupled to the sieve via a fixed arm and a side-shaking coupling portion and configured to move the sieve in the side-to-side direction in the Y dimension. The fixed arm is attached to the sieve and configured to move with the sieve in (i) the fore-aft direction in the X dimension, (ii) the side-to-side direction in the Y dimension and (iii) the up-down direction in the Z dimension. The side-shaking coupling portion comprises a moving portion configured to move in a diagonal direction having a fore-aft component in the X dimension and an up-down component in the Z dimension.

According to one embodiment, the side-shaking coupling portion further includes a bar attached to the side-shaking assembly and the moving portion is movably coupled to the bar and configured to move in the diagonal direction along the length of the bar responsive to the movement of the fixed arm in the fore-aft direction in the X dimension or the up-down direction in the Z dimension.

According to one embodiment, responsive to the movement of the fixed arm in the fore-aft direction in the X dimension or the up-down direction in the Z dimension, the side-shaking assembly is configured to remain substantially stationary in the diagonal direction.

In one embodiment, the side-shaking assembly further includes a mounting device attached to a combine chassis a lower plate rotatably coupled to the mounting device and configured to rotate about a lower plate axis. The assembly further includes an upper plate coupled to the lower plate and configured to (i) have an upper plate rotational motion and rotate responsive to the rotation of the lower plate and (ii) move in a substantially linear direction diagonal to the fore-aft direction in the X dimension and diagonal to the side-to-side direction in the Y dimension. The bar is attached to the upper plate, the side-shaking coupling portion is configured to move in the substantially linear direction diagonal to the fore-aft direction in the X dimension and diagonal to the side-to-side direction in the Y dimension, and diagonal to the up-down direction in the Z dimension and the side-shaking assembly is configured to remain substantially stationary to the substantially linear direction.

In one aspect of an embodiment, the side-shaking assembly further includes a Robert's linkage configuration and the bar is attached to the upper plate of the side-shaking assembly that includes the Robert's linkage configuration.

In another aspect of an embodiment, the side-shaking assembly further includes a Watt's linkage configuration and the bar is attached to the upper plate of the side-shaking assembly that includes the Watt's linkage configuration.

In one embodiment, the side-shaking control system further includes a support device coupled to the side-shaking assembly and the bar. The support device includes a first support device portion attached to the upper plate of the side-shaking assembly and a second support device portion attached to the bar.

In another aspect of an embodiment, the movement of the moving portion ranges from about 1.5 mm to about 5 mm relative to the bar.

Embodiments of the present invention are directed to a combine that includes a combine chassis and a sieve for separating crop material from other material, pivotally coupled to the combine chassis, located in a plane having an X dimension and a Y dimension and configured to: (i) move within the plane in a fore-aft direction in the X dimension, (ii) move within the plane in a side-to-side direction in the Y dimension and (iii) move outside of the plane in an up-down direction in a Z dimension. The combine also includes a side-shaking assembly coupled to the sieve via a fixed arm and a side-shaking coupling portion and configured to move the sieve in the side-to-side direction in the Y dimension. The fixed arm is attached to the sieve and configured to move with the sieve in (i) the fore-aft direction in the X dimension, (ii) the side-to-side direction in the Y dimension and (iii) the up-down direction in the Z dimension. The side-shaking coupling portion comprises a moving portion configured to move in a diagonal direction having a fore-aft component in the X dimension and an up-down component in the Z dimension.

According to one embodiment, the side-shaking coupling portion further includes a bar attached to the side-shaking assembly and the moving portion is movably coupled to the bar and configured to move in the diagonal direction along the length of the bar responsive to the movement of the fixed arm in the fore-aft direction in the X dimension or the up-down direction in the Z dimension.

According to another embodiment, responsive to the movement of the fixed arm in the fore-aft direction in the X dimension or the up-down direction in the Z dimension, the side-shaking assembly is configured to remain substantially stationary in the diagonal direction.

In one embodiment, the side-shaking assembly further includes a mounting device attached to the combine chassis, a lower plate rotatably coupled to the mounting device and configured to rotate about a lower plate axis and an upper plate coupled to the lower plate and configured to (i) have an upper plate rotational motion and rotate responsive to the rotation of the lower plate and (ii) move in a substantially linear direction diagonal to the fore-aft direction in the X dimension and diagonal to the side-to-side direction in the Y dimension. The bar is attached to the upper plate and the side-shaking coupling portion is configured to move in the substantially linear direction diagonal to the fore-aft direction in the X dimension and diagonal to the side-to-side direction in the Y dimension, and diagonal to the up-down direction in the Z dimension. The side-shaking assembly is configured to remain substantially stationary to the substantially linear direction.

In an aspect of an embodiment, the side-shaking assembly includes a Robert's linkage configuration and the bar is attached to the upper plate of the side-shaking assembly that includes the Robert's linkage configuration.

In another aspect of an embodiment, the side-shaking assembly includes a Watt's linkage configuration and the bar is attached to the upper plate of the side-shaking assembly that includes the Watt's linkage configuration.

In one embodiment, the combine further includes a support device coupled to the side-shaking assembly and the bar. The support device comprises a first support device portion attached to the upper plate of the side-shaking assembly and a second support device portion attached to the bar.

In another aspect of an embodiment, the movement of the moving portion ranges from about 1.5 mm to about 5 mm relative to the bar.

Embodiments of the present invention are directed to a method for controlling up-down movement of a side-shaking assembly in a combine that includes moving a sieve, located in a plane having an X dimension and a Y dimension, within the plane in a fore-aft direction in the X dimension, and out of the plane in an up-down direction in a Z dimension. The method also includes moving the sieve, with a side-shaking assembly coupled to the sieve via a fixed arm and a side-shaking coupling portion, in a side-to-side direction in the Y dimension and causing a fixed arm, attached to the sieve, to move with the sieve in (i) the fore-aft direction in the X dimension, (ii) the side-to-side direction in the Y dimension and (iii) the up-down direction in the Z dimension. the method further includes controlling a moving portion of a side-shaking coupling portion, coupled between the fixed arm and the side-shaking assembly, to move in a diagonal direction having a fore-aft component in the X dimension and an up-down component in the Z dimension.

In one embodiment, controlling the moving portion of the side-shaking coupling portion to move with the fixed arm further comprises sliding the moving portion, movably coupled to a bar attached to the side-shaking assembly, in the diagonal direction along the length of the bar responsive to the movement of the fixed arm in the fore-aft direction in the X dimension or the up-down direction in the Z dimension.

In another embodiment, the method further includes controlling the side-shaking assembly to remain substantially stationary in the diagonal direction in the Z dimension responsive to the movement of the fixed arm in the fore-aft direction in the X dimension or the up-down direction in the Z dimension.

According to one embodiment, the method further includes causing a lower plate to rotate about a lower plate axis, rotating an upper plate responsive to the rotation of the lower plate, moving the upper plate in a substantially linear direction diagonal to the fore-aft direction in the X dimension and diagonal to the side-to-side direction in the Y dimension, controlling the side-shaking coupling portion to move in the substantially linear direction diagonal to the fore-aft direction in the X dimension, diagonal to the side-to-side direction in the Y dimension and diagonal to the up-down direction in the z dimension and controlling the side-shaking assembly to remain substantially stationary to the substantially linear direction.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 6A is a schematic diagram illustrating an exemplary combine side-shaking control system having a fixed arm and a side-shaking moving portion in a first position for use with embodiments of the present invention;

FIG. 6B is a schematic diagram illustrating the exemplary combine side-shaking control system of FIG. 6A with the fixed arm and the side-shaking moving portion in a second position for use with embodiments of the present invention.

DETAILED DESCRIPTION OF ILLUSTRATED EMBODIMENTS

Embodiments of the present invention provide systems and methods for providing a control system for a side-shake cleaning mechanism that moves a sieve in a substantially linear direction. Embodiments of the present invention utilize side-shaking coupling portions, such as slider joints, that move in a substantially linear direction with the sieve and cause the side-shaking mechanism to remain substantially stationary in the substantially linear direction, reducing stress and increasing the overall performance of the cleaning system.

Figure 1:
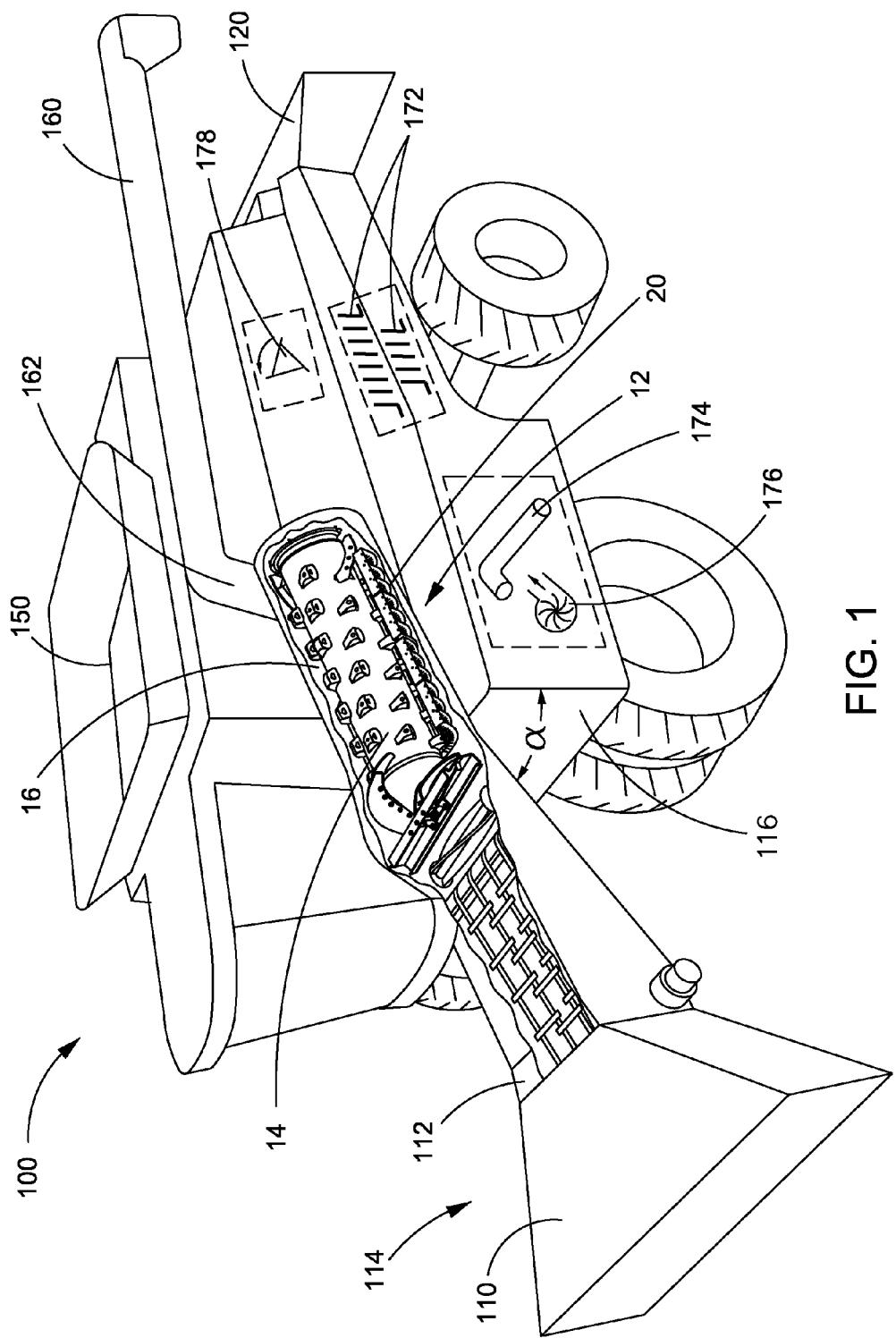
FIG. 1 is a perspective view of an exemplary combine for use with embodiments of the present invention.
Figure 2:
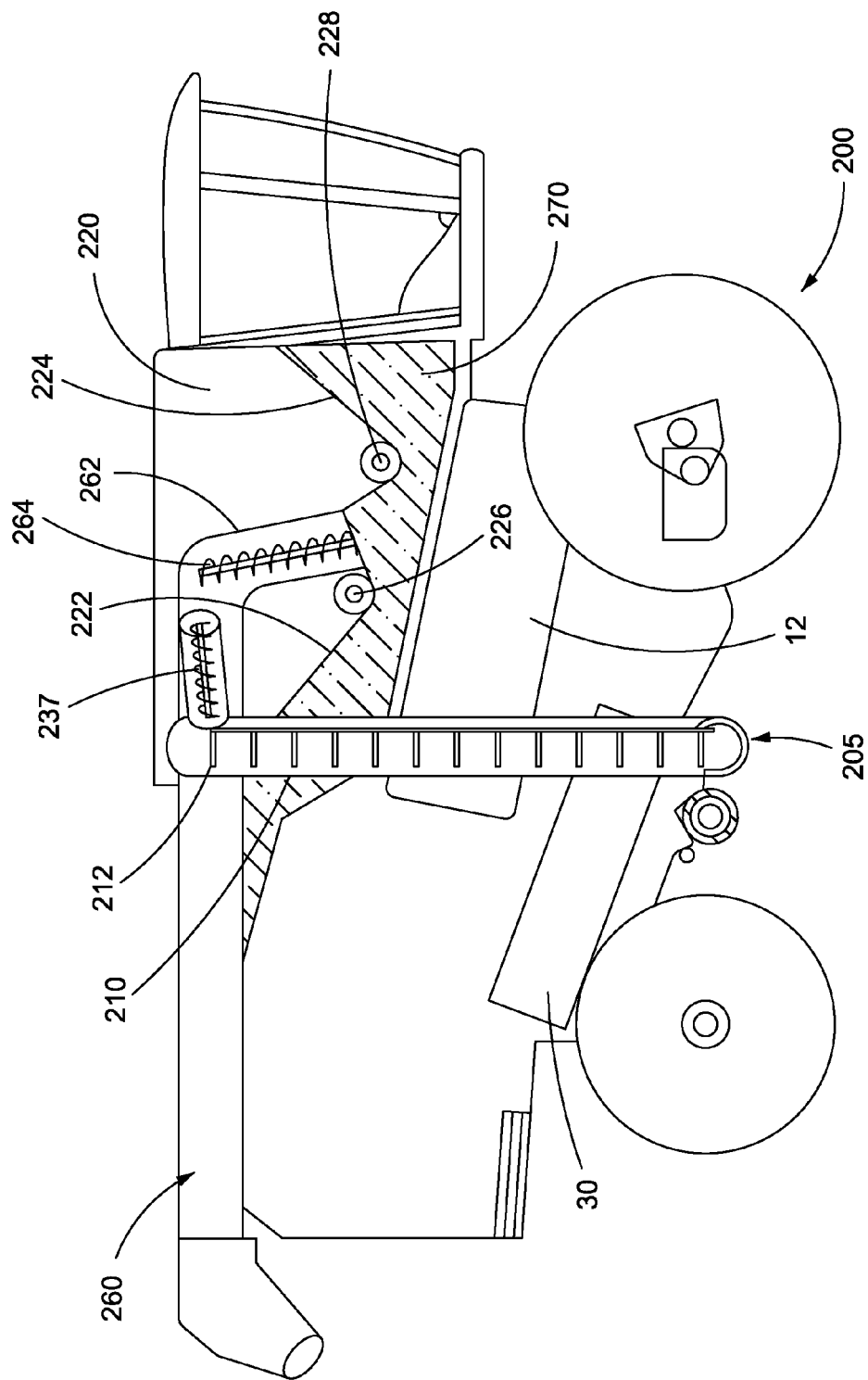
FIG. 2 is a side view of an exemplary combine for use with embodiments of the present invention.
Figure 3:
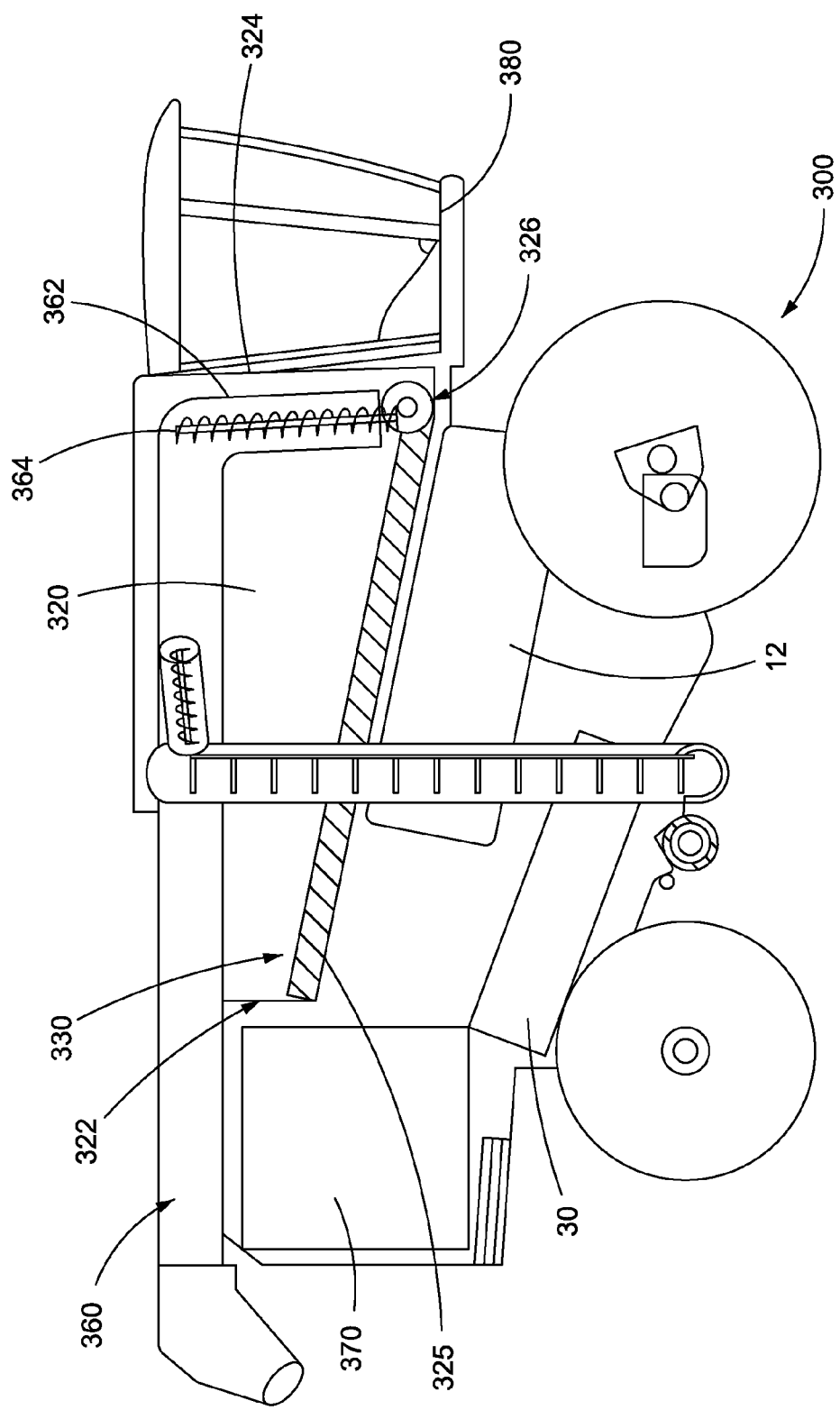
FIG. 3 is a side view of an exemplary combine for use with embodiments of the present invention.

FIG. 1 through FIG. 3 show exemplary agricultural combines in which exemplary embodiments of the present invention may be implemented. FIG. 1 shows an exemplary agricultural combine 100, which may also be referred as a combine or harvester throughout this specification. As shown in FIG. 1, the combine 100 may include a combine frame 116 and a feeding system 114, having a header 110 and a movable feeding mechanism 112. The movable feeding mechanism 112 may have a position which includes an angle α relative to a portion of the combine frame 116. Combine 100 may also include a longitudinally axially arranged threshing and separation system 12, and a concave 20 within the threshing and separation system 12. The threshing mechanism may also be of any well-known construction and operation. In some embodiments, the concave 20 may also be used with combines having transversely aligned threshing and separation system in a combine.

As shown, threshing and separation system 12 is axially arranged, in that it includes a cylindrical threshing rotor 14 conventionally supported and rotatable in a predetermined direction about a rotational axis therethrough for conveying a flow of crop material in a helical flow path through a threshing chamber 16 extend circumferentially around the rotor 14. As shown, concaves 20 may extend circumferentially around the rotor 14 and the flow of crop may pass in the space between the spinning rotor and the concaves. As the crop material flows through the threshing and separation system 12, the crop material including, for example, grain, straw, legumes, and the like, will be loosened and separated from crop residue or MOG (material other than grain) such as, for example, husks, cobs, pods, and the like, and the separated materials may be carried away from the threshing and separation system 12 in a well-known conventional manner. Crop residue can be redistributed to the field via a spreader 120, located at the back of the harvester.

The remaining threshed crop, which includes the grain to be collected, is then cleaned via a cleaning system. The cleaning system can include conventional winnowing mechanisms including a fan 176 that blows air across a series of reciprocating sieves 172. Through the winnowing action of the air and the reciprocating sieves 172, clean grain may be collected and sorted from the remaining chaff. Crop-handling systems, which include augers and elevators, may be used to transport cleaned crop, such as grain, to a grain tank 150 and from the grain tank 150 to a grain cart (not shown). Crop-handling systems may also transport tailings materials back to the cleaning system/threshing system through tailings elevator 174. The clean grain may be conveyed to the grain tank 150 via a cross auger that conveys grain laterally from the bottom of the cleaning system to a vertical conveyor (or elevator) that conveys grain up a load tube to be spilled into grain tank 150. At the bottom of grain tank 150, one or more grain tank augers (such as cross augers) move grain laterally from the bottom of the grain tank 150 to vertical tube 162 of unload tube 160, representing a turret style system of offloading. Vertical tube 162 may include a single unload conveying auger or multiple unload conveying augers, such as an auger for propelling grain up and to another auger within the unload tube 160. Unload tube 160 may be rotated such that it may extend its full length laterally for unloading grain from the grain tank 150 to a support vehicle, such as a truck that is driving along the side of the combine 100. Unload tube 160 may also be oriented to the rear for storage, as shown. In a swivel style offloading system (not shown), the vertical tube 162 and unload tube 160 is replaced by an unload conveying auger that is attached to the one or more cross augers conveying grain from the cleaning system and may pivot from side to side from the combine 100, conveying grain from the combine 100.

FIG. 2 shows a transparent cross-sectional view of another agricultural combine 200 in which exemplary embodiments of the present invention may be implemented. Combine 200 includes a grain tank 220 and a threshing system 12 for threshing crop, such as grain. The threshed crop is then cleaned via the cleaning system 30. The surface in cleaning system 30 separates out clean grain which collects along the path of the bottom of the cleaning system at cross auger 205. The cross auger 205 moves the clean grain laterally to an elevator 210, which includes a paddle chain lift 212. The paddle chain lift 212, wherein the paddles are uniformly spaced along the chain to lift grain, conveys the grain upward to a dispenser auger 237 that discharges the grain into the grain tank 220. In other arrangements, the grain is lifted from the paddle chain lift 212 and then flipped at the top of the elevator to a sump, containing a bubble-up auger. The bubble-up auger transports grain from the sides of the grain tank 220 to the top center of the tank where the grain is discharged in the center of the tank 220 to naturally form a cone-shape pile, wherein the angles of the sides of the cone equal the angle of repose of the grain. Other arrangements implement other auger assemblies to either distribute the grain evenly along the bottom of the grain tank 220 or centrally in the middle of the grain tank 220. In this arrangement of grain tank 220, sloping side walls 222 and 224 are sloped such that as grain accumulates in the grain tank 220 as conveyed from dispenser auger 237, the grain naturally slides down to cross augers 226 and 228. These side walls 222 and 224 are sloped at such an angle that they convene at the bottom of the tank 220 to form the 'W' shape floor bottom, as shown. Grain tank cross augers 226 and 228 convey the accumulated grain laterally so that it may be collected into vertical tube 262 which includes a unload conveying vertical auger 264 that propels the grain upward. This allows grain to be moved into an unload vehicle via unload tube 260, which may include another unload conveying internal auger and may rotate about a pivot coextensive with vertical tube 262. Non-storable grain volume 270 is identified by slash marks in FIG. 2 to show space effectively unusable between the grain tank, and the threshing system 12 due to the geometry of the sloped sides 222 and 224 forming the floor of the grain tank 220.

FIG. 3 shows another agricultural combine 300 in which exemplary embodiments of the present invention may be implemented. Combine 300 includes an engine 370, cab 380 a grain tank 320. Grain tank 320 includes vertical side walls 322 and 324 and generally flat bottom 325. Along the bottom 325 of grain tank 320, a conveying system 330 is placed. Bottom 325 includes an active conveying system 330 such that grain tank 320 need not rely on gravity to feed grain into the cross auger. Conveying system 330, in some embodiments, conveys collected grain forward in the grain tank 320 to a single grain tank cross auger 326. Cross auger 326 then conveys the grain laterally to be collected by vertical tube 362, which includes a vertical unload conveying auger 364 to propel the grain upward. This sends grain into an unload tube 360, which may include another unload conveying auger (not shown).

Figure 4:
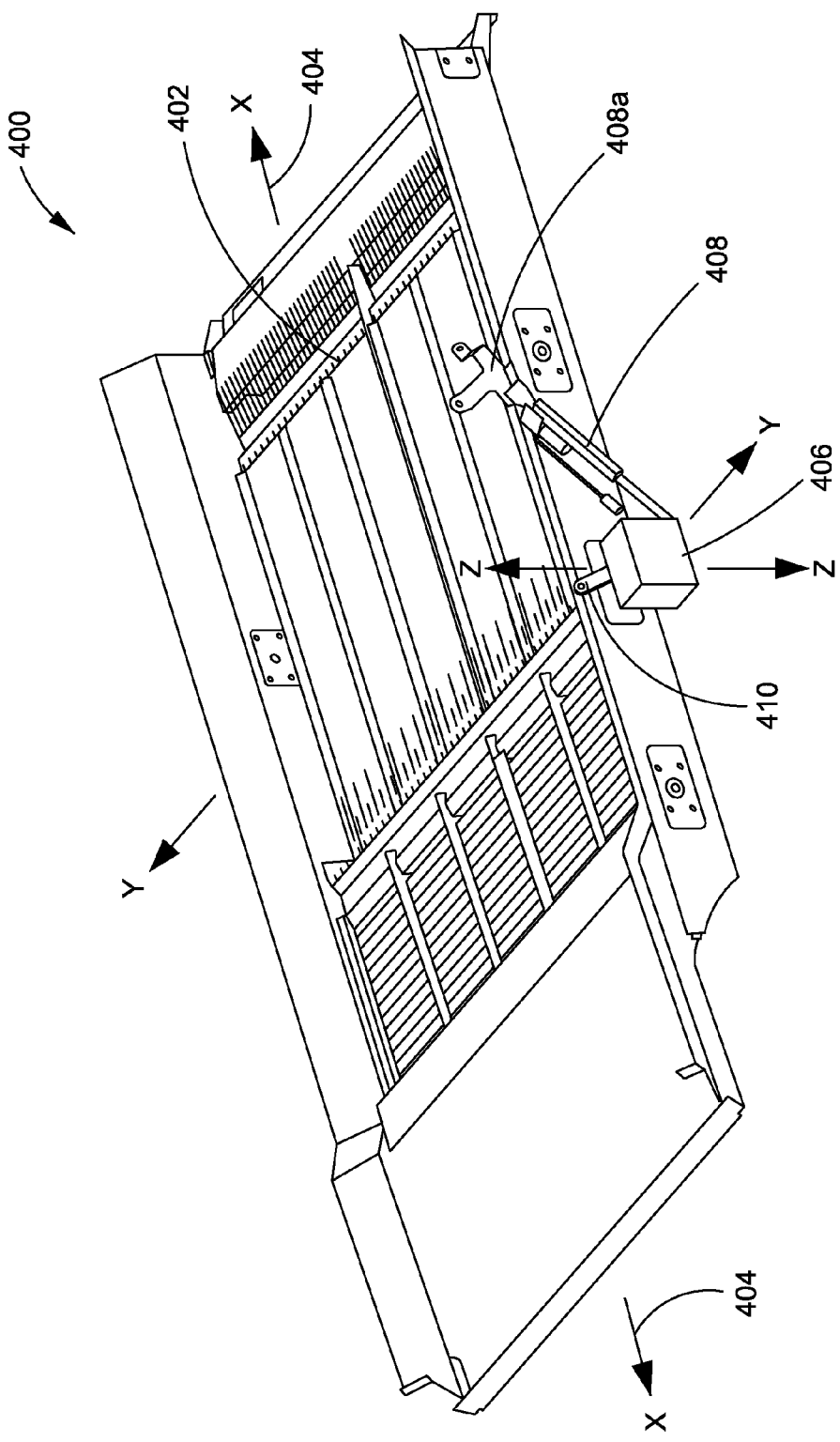
FIG. 4 is a perspective view of an exemplary combine side-shaking control system for use with embodiments of the present invention.
Figure 5:
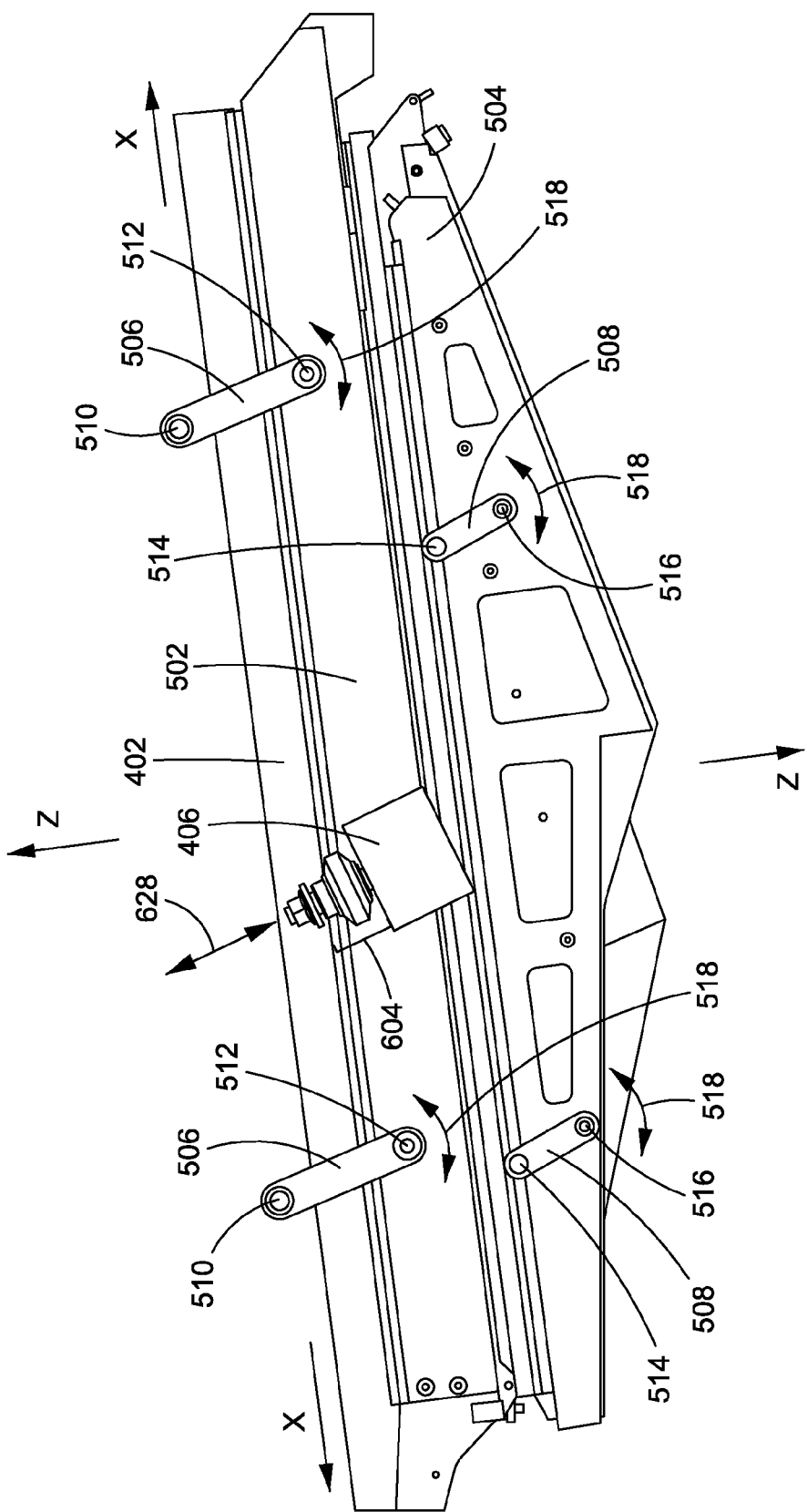
FIG. 5 is a side view of an exemplary combine side-shaking control system for use with embodiments of the present invention.

FIG. 4 and FIG. 5 illustrate an exemplary combine side-shaking control system 400 for use with embodiments of the present invention. FIG. 4 is a perspective view of an exemplary combine side-shaking control system 400. As shown at FIG. 4, the side-shaking control system 400 may include a sieve 402 for separating crop material from other material and a side-shaking assembly 406 that may be coupled to the sieve 402 via a fixed arm 410. Sieve 402 is located in a plane having an X dimension and a Y dimension. In the embodiment, shown at FIG. 4, the side-shaking control system 400 includes actuation device 408, which may be attached to the combine chassis 612 by actuation device mounting portion 408a.

FIG. 5 is a side view of the exemplary combine side-shaking control system 400. As shown at FIG. 5, the sieve 402 may include an upper sieve portion 502 and a lower sieve portion 504. The sieve 402 may be pivotably coupled to a combine chassis 612. For example, the side-shaking control system 400 may include upper support arms 506 and lower support arms 508 that pivotably couple sieve 402 to the combine chassis 612. Upper support arms 506 may be coupled to the combine chassis 612 at first upper support arm ends 510 and may be coupled to the sieve 402 at second upper support arm ends 512. Lower support arms 508 may be coupled to the combine chassis 612 at first lower support arm ends 514 and may be coupled to the sieve 402 at second lower support arm ends 516. When sieve 402 pivots via upper support arms 506 and lower support arms 508, sieve 402 moves in an arc, as indicated by arrows 518. The direction of the arc may change depending on the lengths of the upper support arms 506 and lower support arms 508. Accordingly, sieve 402 may move within the X-Y plane in a fore-aft direction in the X dimension and move outside of the X-Y plane in an up-down direction in a Z dimension. Sieve 402 may also be configured to move within the X-Y plane in a side-to-side direction in the Y dimension by side-shaking assembly 406. Side-shaking control system 400 also includes a side-shaking assembly 406 which may be coupled to the sieve 402 via fixed arm 410 (shown in FIG. 6A and FIG. 6B) and side-shaking coupling portion 604.

FIG. 6A and FIG. 6B, are schematic diagrams illustrating an exemplary side-shaking control system 600 that includes a side-shaking assembly 602 coupled to the sieve 402 via fixed arm 410 and side-shaking coupling portion 604. Side-shaking coupling portion 604 may include moving portion 606 and bar 608. Fixed arm 410 may be attached to the sieve 402 and configured to move in (i) the fore-aft direction in the X dimension, (ii) the side-to-side direction in the Y dimension and (iii) the up-down direction in the Z dimension. That is, when sieve 402 pivots via upper support arms 506 and lower support arms 508 and moves in an arc, fixed arm 410 also moves within the X-Y plane in the fore-aft direction in the X dimension and moves outside of the X-Y plane in an up-down direction in a Z dimension. Further, when sieve 402 is caused by side-shaking assembly 406 to move within the X-Y plane in the side-to-side direction in the Y dimension, fixed arm 410 also moves within the X-Y plane in the side-to-side direction in the Y dimension.

According to some embodiments, moving portion 606 of side-shaking coupling portion 604 may be configured to move in a diagonal direction 628 having a fore-aft component in the X dimension and an up-down component in the Z dimension. Moving portion 606 of side-shaking coupling portion 604 may be movably coupled to the bar 608 and configured to move in a diagonal direction 628 having a fore-aft component in the X dimension and an up-down component in the Z dimension along the length of the bar 608 responsive to the movement of the fixed arm 410 in the fore-aft direction in the X dimension or the up-down direction in the Z dimension.

For example, moving portion 606 of side-shaking coupling portion 604 may be configured to oscillate in the diagonal direction 628 between positions shown at FIG. 6A and FIG. 6B. FIG. 6A illustrates moving portion 606 and fixed arm 410 in a first position and FIG. 6B illustrates moving portion 606 and fixed arm 410 in a second position. As shown at FIG. 6A, moving portion 606 is a distance "a" from a top surface 610 of side-shaking assembly 602 while in the first position and fixed arm 410 is a distance "c" from the top surface 610 of side-shaking assembly 602 while in the first position. As shown at FIG. 6A and FIG. 6B, fixed arm 410 may move from a first position in FIG. 6A (at a distance "c" from the top surface 610 of side-shaking assembly 602) to a second position in FIG. 6B (at a distance "d" from the top surface 610 of side-shaking assembly 602). Responsive to the movement of the fixed arm 410, moving portion 606 may also move in the diagonal direction 628 having a fore-aft component in the X dimension and an up-down component in the Z dimension along the length of the bar 608 from a first position in FIG. 6A (at a distance "a" from the top surface 610 of side-shaking assembly 602) to a second position in FIG. 6B (at a distance "b" from the top surface 610 of side-shaking assembly 602). Further, responsive to the movement of the fixed arm in the fore-aft direction in the X dimension or the up-down direction in the Z dimension, side-shaking assembly is configured to remain substantially stationary in the diagonal direction 628, which may be about 1 mm or less than 1 mm from its original position. Movement of fixed arm 410 and moving portion 606 in the diagonal direction 628 may range from about 1.0 mm to about 5 mm, with a preferred movement of about 2.5 mm.

Exemplary combine side-shaking control systems may include side-shaking assemblies having different linkage configurations for converting rotational motion to approximate straight-line motion. Co-pending U.S. patent application Ser. No. 13/715,251 entitled "Combine Linear Side-Shake Cleaning Control System" is incorporated herein by reference for its teachings on side-shaking control systems and side-shaking assemblies having different linkage configurations, such as a Robert's linkage configuration and a Watt's linkage configuration, for converting rotational motion to approximate straight-line motion.

In some embodiments, an exemplary combine side-shaking control system may include a side-shaking assembly, such as side-shaking assembly 602, having a Robert's linkage configuration for converting rotational motion to approximate straight-line motion. Side-shaking assembly 602 may be coupled to the sieve via fixed arm 410 and side-shaking coupling portion 604 and configured to move the sieve 402 in the side-to-side direction in the Y dimension.

In other embodiments, an exemplary combine side-shaking control system may include a side-shaking assembly having a Watt's linkage configuration for converting rotational motion to approximate straight-line motion. An exemplary side-shaking assembly, having a Watt's linkage configuration, may also be coupled to sieve 402 via fixed arm 410 and side-shaking coupling portion 604 and configured to move the sieve 402 in the side-to-side direction in the Y dimension. It is contemplated that other side-shaking assemblies, including side-shaking assemblies having other linkage configurations for converting rotational motion to approximate straight-line motion, may be coupled to sieve 402 via fixed arm 410 and side-shaking coupling portion 604 and configured to move the sieve 402 in the side-to-side direction in the Y dimension.

Referring to the embodiment shown at FIG. 6A and FIG. 6B, side-shaking assembly 602, having a Robert's linkage configuration may include a mounting device 614 attached to combine chassis 612 and a lower plate 616. Lower plate 616 may be rotatably coupled to the mounting device 614 and configured to rotate about a lower plate axis (not shown). Side-shaking assembly 602 may also include an upper plate 618 coupled to the lower plate 616. As described in co-pending U.S. patent application Ser. No. 13/715,251 entitled "Combine Linear Side-Shake Cleaning Control System", when lower plate 616 and the upper plate 618 of a Robert's linkage configuration side-shaking assembly 602 are in a non-engaging position, the side-to-side component of the sieve 402 is not engaged. When the lower plate 616 and the upper plate 618 are in the engaging position, the side-to-side component of the sieve 402 is engaged. Upper plate 618 of the Robert's linkage configuration side-shaking assembly 602 may be configured to have an upper plate rotational motion and rotate between engaging positions and a non-engaging position via pivot arms 620. Responsive to the rotation of the upper plate 618 into the engaging position, upper plate 618 may be configured to move with the sieve 402 and the fixed arm 410 in a substantially linear direction diagonal to the fore-aft direction in the X dimension and diagonal to the side-to-side direction in the Y dimension.

As shown at FIG. 6A and FIG. 6B, the bar 608 may be attached to the upper plate 618. Accordingly, the side-shaking coupling portion 604 may also be configured to move with the upper plate 618, the sieve 402 and the fixed arm 410 in the substantially linear direction diagonal to the fore-aft direction in the X dimension and diagonal to the side-to-side direction in the Y dimension. That is, when upper plate 618 rotates responsive to the rotation of the lower plate 616 into an engaging position, upper plate 618, fixed arm 410, side-shaking coupling portion 604 and sieve 402 move in the substantially linear direction diagonal to the fore-aft direction in the X dimension and diagonal to the side-to-side direction in the Y dimension. Responsive to the movement of the fixed arm 410 and the sieve 402 in the up-down direction in the Z dimension, however, the side-shaking assembly 602 is configured to remain substantially stationary in the up-down direction in the Z dimension.

According to an aspect of one embodiment, the side-shaking control system 600 may include a support device 622 coupled to the side-shaking assembly 602 and the bar 608. The support device 622 may be configured to keep bar 608 from deflecting when the lower plate 616 is in a side-shake engaging position. The support device may include a first support device portion 624 attached to the upper plate 618 of the side-shaking assembly 602 and a second support device portion 626 attached to the bar 608. When upper plate 618 rotates responsive to the rotation of the lower plate 616 into a side-shake engaging position, upper plate 618, fixed arm 410, side-shaking coupling portion 604, sieve 402 and support device 622 move in the substantially linear direction diagonal to the fore-aft direction in the X dimension and diagonal to the side-to-side direction in the Y dimension.

Figure 7:
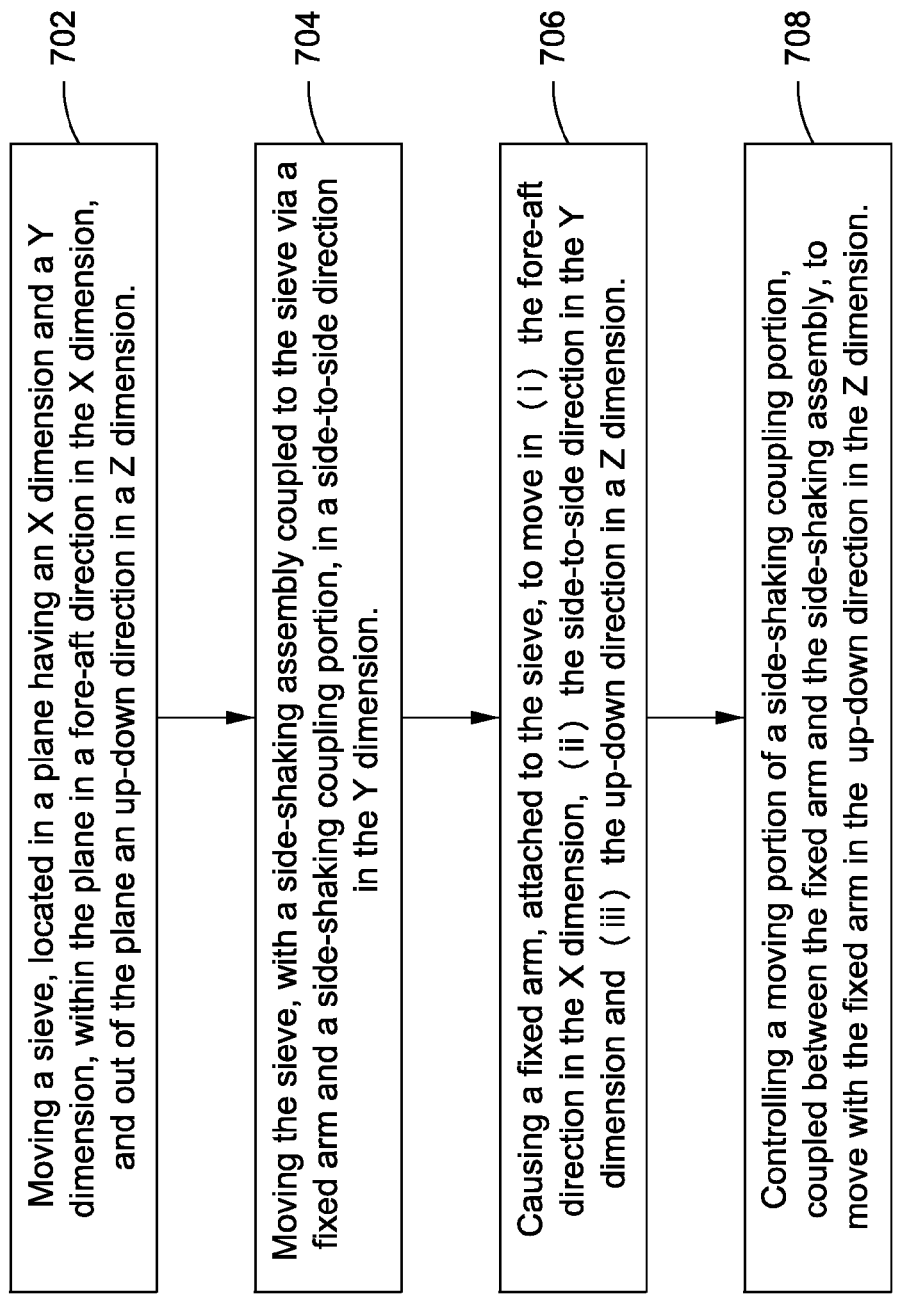
FIG. 7 is a flow chart illustrating a method for controlling up-down movement of a side-shaking assembly in a combine in accordance with an embodiment of the invention.

FIG. 7 is a flow chart illustrating a method for controlling up-down movement of a side-shaking assembly in a combine 100, 200, 300 in accordance with an embodiment of the invention.

As shown at block 702, the method includes moving a sieve, located in a plane having an X dimension and a Y dimension, within the plane in a fore-aft direction in the X dimension, and out of the plane in an up-down direction in a Z dimension. For example, an actuation device (not shown) may cause sieve 402 to move relative to the combine chassis 612 and pivot via upper support arms 506 and lower support arms 508. The pivoting motion may cause sieve 402 to move in an arc, as indicated by arrows 518. Accordingly, sieve 402 may move within the X-Y plane in a fore-aft direction in the X dimension and move outside of the X-Y plane in an up-down direction in a Z dimension.

As shown at block 704, the method includes moving the sieve, with a side-shaking assembly coupled to the sieve via a fixed arm 410 and a side-shaking coupling portion 604, in a side-to-side direction in the Y dimension. For example, a side-shaking assembly 602 having a Robert's linkage configuration for converting rotational motion to approximate straight-line motion, may move the sieve 402 in the side-to-side direction in the Y dimension. Lower plate 616 of side-shaking assembly 602 may be caused to rotate about a lower plate axis (not shown). Responsive to the rotation of the lower plate 616, upper plate 618 may rotate to an engaging position. While in the engaging position, upper plate 618 may move with the sieve 402 and the fixed arm 410 in a substantially linear direction diagonal to the fore-aft direction in the X dimension and diagonal to the side-to-side direction in the Y dimension.

As shown at block 706, the method includes causing a fixed arm, attached to the sieve, to move in (i) the fore-aft direction in the X dimension, (ii) the side-to-side direction in the Y dimension and (iii) the up-down direction in the Z dimension. For example, when sieve 402 pivots via upper support arms 506 and lower support arms 508 and moves in an arc, fixed arm 410 also moves within the X-Y plane in the fore-aft direction in the X dimension and moves outside of the X-Y plane in an up-down direction in a Z dimension. Further, when sieve 402 is caused by side-shaking assembly 406 to move within the X-Y plane in the side-to-side direction in the Y dimension, fixed arm 410 also moves within the X-Y plane in the side-to-side direction in the Y dimension.

As shown at block 708, the method includes controlling a moving portion 606 of a side-shaking coupling portion 604, coupled between the fixed arm 410 and the side-shaking assembly 602, to move in a diagonal direction 628 having a fore-aft component in the X dimension and an up-down component in the Z dimension. For example, as shown at FIG. 6A, moving portion 606 is a distance "a" from a top surface 610 of side-shaking assembly 602 and fixed arm 410 is a distance "c" from the top surface 610 of side-shaking assembly 602 while in a first position. As shown at FIG. 6A and FIG. 6B, fixed arm 410 may move from the first position in FIG. 6A (at a distance "c" from the top surface 610 of side-shaking assembly 602) to a second position in FIG. 6B (at a distance "d" from the top surface 610 of side-shaking assembly 602). Responsive to the movement of the fixed arm 410, moving portion 606 may also move in the diagonal direction 628 having a fore-aft component in the X dimension and an up-down component in the Z dimension along the length of the bar 608 from a first position in FIG. 6A (at a distance "a" from the top surface 610 of side-shaking assembly 602) to a second position in FIG. 6B (at a distance "b" from the top surface 610 of side-shaking assembly 602). Further, when sieve 402 is caused by side-shaking assembly 406 to move within the X-Y plane in the side-to-side direction in the Y dimension, fixed arm 410 also moves within the X-Y plane in the side-to-side direction in the Y dimension.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A combine side-shaking control system, comprising:
a sieve for separating crop material from other material, located in a plane having an X dimension and a Y dimension and having mounting supports for connection to the combine, the supports and sieve are configured for the sieve to: (i) move within the plane in a fore-aft direction in the X dimension, (ii) move within the plane in a side-to-side direction in the Y dimension and (iii) move outside of the plane in an up-down direction in a Z dimension;
a mounting device configured for attachment to a combine chassis;
a side-shaking assembly coupled to the mounting device and to the sieve via a fixed arm and a side-shaking coupling portion and configured to move the sieve in the side-to-side direction in the Y dimension, wherein
the fixed arm is attached to the sieve and configured to move with the sieve in (i) the fore-aft direction in the X dimension, (ii) the side-to-side direction in the Y dimension and (iii) the up-down direction in the Z dimension; and
wherein the side-shaking coupling portion comprises a moving portion configured to move in a diagonal direction having a fore-aft component in the X dimension and an up-down component in the Z dimension, the fixed arm is coupled to the moving portion such the fixed arm and sieve is moved with respect to the side shake assembly changing the relative position of the arm and side shake assembly at least with respect to the Z dimension responsive to the movement of the fixed arm.

2. The side-shaking control system of claim 1, wherein
the side-shaking coupling portion further comprises a bar attached to the side-shaking assembly and the mounting device, and
the moving portion is movably coupled to the bar forming a sliding joint wherein the moving portion and configured to move in the diagonal direction along the length of the bar responsive to the movement of the fixed arm in the fore-aft direction in the X dimension or the up-down direction in the Z dimension.

3. The side-shaking control system of claim 2, wherein responsive to the movement of the fixed arm in the fore-aft direction in the X dimension or the up-down direction in the Z dimension, the side-shaking assembly is configured to remain substantially stationary in the diagonal direction.

4. The side-shaking control system of claim 2, wherein the side-shaking assembly further comprises:
a mounting device attached to a combine chassis;
a lower plate rotatably coupled to the mounting device and configured to rotate about a lower plate axis; and
an upper plate coupled to the lower plate and configured to (i) have an upper plate rotational motion and rotate responsive to the rotation of the lower plate and (ii) move in a substantially linear direction diagonal to the fore-aft direction in the X dimension and diagonal to the side-to-side direction in the Y dimension, wherein
the bar is attached to the upper plate,
the side-shaking coupling portion is configured to move in the substantially linear direction diagonal to the fore-aft direction in the X dimension and diagonal to the side-to-side direction in the Y dimension, and diagonal to the up-down direction in the Z dimension; and
the side-shaking assembly is configured to remain substantially stationary in the substantially linear direction.

5. The side-shaking control system of claim 4, wherein the side-shaking assembly includes a Robert's linkage configuration and the bar is attached to the upper plate of the side-shaking assembly that includes the Robert's linkage configuration.

6. The side-shaking control system of claim 4, wherein the side-shaking assembly includes a Watt's linkage configuration and the bar is attached to the upper plate of the side-shaking assembly that includes the Watt's linkage configuration.

7. The side-shaking control system of claim 4, further comprising a support device coupled to the side-shaking assembly and the bar, wherein
the support device comprises a first support device portion attached to the upper plate of the side-shaking assembly and a second support device portion attached to the bar.

8. The side-shaking control system of claim 2, wherein the movement of the moving portion ranges from about 1.5 mm to about 5 mm relative to the bar.

9. A combine comprising:
a combine chassis;
a sieve for separating crop material from other material, pivotably coupled to the combine chassis, located in a plane having an X dimension and a Y dimension and the sieve mounted to supports configured such that sieve can: (i) move within the plane in a fore-aft direction in the X dimension, (ii) move within the plane in a side-to-side direction in the Y dimension and (iii) move outside of the plane in an up-down direction in a Z dimension;
a side-shaking assembly coupled to the sieve via a fixed arm and a side-shaking coupling portion and configured to move the sieve in the side-to-side direction in the Y dimension, wherein
the fixed arm is attached to the sieve and configured to move with the sieve in (i) the fore-aft direction in the X dimension, (ii) the side-to-side direction in the Y dimension and (iii) the up-down direction in the Z dimension; and
the side-shaking coupling portion comprises a moving portion configured to move in a diagonal direction having a fore-aft component in the X dimension and an up-down component in the Z dimension;
the side-shaking coupling portion further comprises a bar attached to the side-shaking assembly, and
the moving portion is movably coupled to the bar and configured to move in the diagonal direction along the length of the bar responsive to the movement of the fixed arm in the fore-aft direction in the X dimension or the up-down direction in the Z dimension;
wherein responsive to the movement of the fixed arm in the fore-aft direction in the X dimension or the up-down direction in the Z dimension, the side-shaking assembly is configured to remain substantially stationary in the diagonal direction;
a mounting device attached to the combine chassis;
a lower plate rotatably coupled to the mounting device and configured to rotate about a lower plate axis; and
an upper plate coupled to the lower plate and configured to (i) have an upper plate rotational motion and rotate responsive to the rotation of the lower plate and (ii) move in a substantially linear direction diagonal to the fore-aft direction in the X dimension and diagonal to the side-to-side direction in the Y dimension, wherein
the bar is attached to the upper plate,
the side-shaking coupling portion is configured to move in the substantially linear direction diagonal to the fore-aft direction in the X dimension and diagonal to the side-to-side direction in the Y dimension, and diagonal to the up-down direction in the Z dimension; and
the side-shaking assembly is configured to remain substantially stationary in the substantially linear direction.

10. The combine of claim 9, wherein the side-shaking assembly includes a Robert's linkage configuration and the bar is attached to the upper plate of the side-shaking assembly that includes the Robert's linkage configuration.

11. The combine of claim 9, wherein the side-shaking assembly includes a Watt's linkage configuration and the bar is attached to the upper plate of the side-shaking assembly that includes the Watt's linkage configuration.

12. The combine of claim 9, further comprising a support device coupled to the side-shaking assembly and the bar, wherein
the support device comprises a first support device portion attached to the upper plate of the side-shaking assembly and a second support device portion attached to the bar.

13. The combine of claim 9, wherein the movement of the moving portion ranges from about 1.5 mm to about 5 mm relative to the bar.

14. A method for controlling up-down movement of a side-shaking assembly in a combine comprising:
moving a sieve, located in a plane having an X dimension and a Y dimension, within the plane in a fore-aft direction in the X dimension, and out of the plane in an up-down direction in a Z dimension;
moving the sieve, with a side-shaking assembly coupled to the sieve via a fixed arm and a side-shaking coupling portion, in a side-to-side direction in the Y dimension;
causing a fixed arm, attached to the sieve, to move with the sieve in (i) the fore-aft direction in the X dimension, (ii) the side-to-side direction in the Y dimension and (iii) the up-down direction in the Z dimension;
controlling a moving portion of a side-shaking coupling portion, coupled between the fixed arm and the side-shaking assembly, to move in a diagonal direction having a fore-aft component in the X dimension and an up-down component in the Z dimension, wherein the fixed arm is coupled to the moving portion such that the position of the fixed arm is moved in the diagonal direction with respect to the side shake assembly responsive to the movement of the fixed arm.

15. The method of claim 14, wherein controlling the moving portion of the side-shaking coupling portion to move with the fixed arm further comprises sliding the moving portion, movably coupled to a bar attached to the side-shaking assembly, in the diagonal direction along the length of the bar responsive to the movement of the fixed arm in the fore-aft direction in the X dimension or the up-down direction in the Z dimension.

16. The method of claim 15, further comprising controlling the side-shaking assembly to remain substantially stationary in the diagonal direction in the Z dimension responsive to the movement of the fixed arm in the fore-aft direction in the X dimension or the up-down direction in the Z dimension.

17. The method of claim 15, further comprising
causing a lower plate to rotate about a lower plate axis;
rotating an upper plate responsive to the rotation of the lower plate;
moving the upper plate in a substantially linear direction diagonal to the fore-aft direction in the X dimension and diagonal to the side-to-side direction in the Y dimension;
controlling the side-shaking coupling portion to move in the substantially linear direction diagonal to the fore-aft direction in the X dimension, diagonal to the side-to-side direction in the Y dimension and diagonal to the up-down direction in the Z dimension; and
controlling the side-shaking assembly to remain substantially stationary in the substantially linear direction.

* * * * *